(12) United States Patent
Szybalski et al.

(10) Patent No.: US 8,825,376 B1
(45) Date of Patent: Sep. 2, 2014

(54) SYSTEM AND METHOD FOR PROVIDING ALTERNATIVE ROUTES

(71) Applicant: Google Inc., Mountain View, CA (US)

(72) Inventors: Andrew Timothy Szybalski, San Francisco, CA (US); Jocelyn Lin, Mountain View, CA (US); Daniel Timothy Hoag, Mountain View, CA (US); Audrey Ya-Jun Yang, San Francisco, CA (US); Judith Shade, Tokyo (JP); Jens Riegelsberger, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/729,182

(22) Filed: Dec. 28, 2012

Related U.S. Application Data

(60) Provisional application No. 61/658,174, filed on Jun. 11, 2012.

(51) Int. Cl.
*G01C 21/36* (2006.01)
*G01C 21/34* (2006.01)

(52) U.S. Cl.
USPC .................................................. 701/412

(58) Field of Classification Search
USPC ............... 701/412, 413, 417, 431, 436; 340/995.23, 995.15, 995.14
See application file for complete search history.

(56) References Cited

U.S. PATENT DOCUMENTS

| | | | |
|---|---|---|---|
| 8,401,789 B2 * | 3/2013 | Natsume | 701/527 |
| 2002/0022923 A1 * | 2/2002 | Hirabayashi et al. | 701/200 |
| 2007/0129055 A1 * | 6/2007 | Ehlers | 455/404.2 |
| 2007/0143011 A1 * | 6/2007 | Sato | 701/208 |
| 2008/0033636 A1 * | 2/2008 | Ryu et al. | 701/201 |
| 2009/0287408 A1 * | 11/2009 | Gerdes et al. | 701/202 |
| 2013/0103313 A1 * | 4/2013 | Moore et al. | 701/533 |
| 2013/0212509 A1 * | 8/2013 | Van Seggelen et al. | 715/771 |

* cited by examiner

*Primary Examiner* — Tan Q Nguyen
(74) *Attorney, Agent, or Firm* — Dority & Manning, P.A.

(57) ABSTRACT

At least some embodiments herein provide a navigation interface which provides notifications to a user regarding the impact a missed transit connection will have on the user's final arrival time. The navigation interface may also provide pre-calculated transit-based route alternatives. The missed connection notifications and pre-calculated alternatives may allow an individual to a make more informed decisions regarding the route he/she is travelling to his/her desired destination.

18 Claims, 5 Drawing Sheets

SYSTEM AND METHOD FOR PROVIDING ALTERNATIVE ROUTES

RELATED APPLICATION

This application claims priority under 35 U.S.C. §119(e) to U.S. Provisional Application No. 61/658,174, entitled "SYSTEM AND METHOD FOR PROVIDING ALTERNATIVE ROUTES," filed Jun. 11, 2012, which is hereby incorporated by reference in its entirety for all purposes.

BACKGROUND OF THE DISCLOSURE

1. Field of the Invention

Aspects of the present invention relate to a system and method for providing transit-based route alternatives to a user.

2. Discussion of Related Art

Navigation systems are commonly utilized by individuals to obtain navigation routes to desired destinations. An individual typically enters a desired destination into the navigation system via an interface and based on retrieved Global Positioning System (GPS) information and stored maps, the navigation system generates and provides to the individual, via a display, a multi-step route from the individual's current location to the desired destination. As the individual follows the multi-step route and completes different portions of the route, the display is updated to account for the changing location of the individual and the next step of the multi-step route that the individual should follow.

Such navigation systems are commonly found in mobile computing devices such as stand-alone navigation systems, mobile phones or other devices and may be utilized in a variety of different situations. For example, an individual may utilize a navigation system enabled mobile device within an automobile to provide driving instructions. In another example, an individual may utilize a navigation system enabled mobile device to provide instructions on how to reach a desired destination while walking. Additionally, in other examples, an individual may use a navigation system enabled mobile device to provide instructions for a multi-mode route (i.e., a route using more than one mode of transportation).

SUMMARY

As described above, navigation systems are commonly utilized by individuals to provide instructions on how the individual should reach a desired destination and may provide instructions for a multi-mode route. In addition to driving and walking, as discussed above, navigation systems may also include transit-based instructions within a route provided to an individual.

Transit-based instructions may include instructions based on travel via public transportation or public transit. Public transportation or public transit is a shared passenger transportation service which is typically provided to the general public within populated areas. Public transit may include buses, trolleys, trams, trains, shuttles, bike share programs, ferries, water taxis, or any other form of transportation. Public transit typically operates according to planned routes and predetermined timetables that are provided by the transport operator to allow travelers to plan their trip based on different connections.

In addition to GPS and map information, navigation system enabled mobile devices can also retrieve public transit information such as planned routes and predetermined timetables and may use this transit-based information when providing a route to an individual. For example, as part of a route displayed to an individual, a navigation system enabled mobile device may instruct the individual to walk one mile down Main Street, take a right turn, and walk one mile down Broadway to the nearest train station to catch a 11 p.m. train connection in order to arrive at the desired destination at a calculated final arrival time.

However, such transit-based route information provided to an individual by a navigation system enabled mobile device may be insufficient. In the example noted above, the individual receiving the transit-based instructions is not informed by the navigation system of the impact of missing the 11 p.m. train connection on the final arrival time at the desired destination. The individual may assume that if he/she misses the 11 p.m. connection, then another train will arrive in due course. However, the 11 p.m. train connection may be the last train available to the desired destination until some time the next day, or there may be another train that arrives shortly but would result in the individual missing a connection down the line. Absent such information, the individual may become stranded, seriously delayed, and/or forced to look for alternative routes or lodging if he/she misses the 11 p.m. connection. However, if the individual is made aware in advance of the impact of missing the transit connection, the individual can make more informed decisions regarding the effort he/she wishes to expend in reaching the train station in sufficient time to catch the 11 p.m. train.

As such, at least some embodiments herein provide a navigation interface which provides notifications to a user regarding the impact a missed transit connection will have on the user's final arrival time. The navigation interface may also provide pre-calculated transit-based route alternatives. The missed connection notifications and pre-calculated alternatives may allow an individual to make more informed decisions regarding the route he/she is travelling to his/her desired destination.

Aspects in accord with the present invention are directed to a routing system for providing a current route to a desired destination of a user, the current route including at least one transit connection, the system comprising a display, and a navigation interface provided on the display, the interface configured to provide current route information related to the current route to the user, the current route information including a route indicator displaying at least one step of the current route, a next connection time indicator displaying a departure time of the at least one transit connection in the current route, an arrival time indicator displaying a calculated final arrival time at the destination based on the current route, and a missed connection indicator displaying a notification representative of a predicted impact on the calculated final arrival time due to the user missing the at least one transit connection.

According to one embodiment, the interface is further configured to provide at least one pre-calculated alternative route notification to the user. In one embodiment, the at least one pre-calculated alternative route notification provides alternative route information related to an alternative route to the desired destination, the alternative route information including at least one of an alternative route indicator displaying at least one step of the alternative route, an alternative next connection time indicator displaying a departure time of at least one transit connection in the alternative route, an alternative arrival time indicator displaying a calculated alternative final arrival time at the destination based on the alternative route, and an alternative missed connection indicator displaying a notification representative of a predicted impact on the alternative final arrival time due to the user missing the at least one transit connection in the alternative route. In another embodiment, the at least one pre-calculated alternative route notification is provided adjacent the current route information.

According to another embodiment, the navigation interface is further configured to replace the current route information with the alternative route information in response to an action by the user. In one embodiment, the display is a touch screen and the action by the user is at least one of a swiping action and a long-press input on the display.

According to one embodiment, the at least one pre-calculated alternative route notification is overlaid on top of the current route indicator. In one embodiment, the missed connection indicator includes an avatar. In one embodiment, the avatar includes a facial expression.

According to another embodiment, the interface is further configured to provide a progress indicator, the progress indicator providing information related to whether the user is currently travelling at an appropriate speed to catch the at least one transit connection in the current route. In one embodiment, the progress indicator is represented by a speedometer.

Another aspect in accord with the present invention provides a method for providing a current route to a desired destination of a user via a routing system, the routing system including a navigation interface and memory, the method comprising acts of receiving, with the navigation interface, the desired destination of the user, current GPS information of the user, and transit information, generating, based on the desired destination of the user, the current GPS information of the user, the transit information, and map information stored in memory, a current route to the desired destination, the current route including at least one transit connection, providing, with a display of the navigation interface, information related to the current route including a route indicator including at least one step of the current route, a next connection time indicator displaying a departure time of the at least one transit connection in the current route, a final arrival time indicator including a calculated final arrival time at the desired destination based on the current route, a missed connection indicator including an indication of a predicted impact on the final arrival time due to the user missing the at least one transition connection in the current route.

According to one embodiment, the method further comprises acts of generating, based on the desired destination of the user, the current GPS information of the user, the transit information, and map information stored in memory, at least one alternative route to the desired destination, the at least one alternative route including at least one transit connection, and providing an alternative route notification to the user, the alternative route notification including information related to the alternative route including at least one of a route indicator including at least one step of the alternative route, a next connection time indicator including a departure time of the at least one transit connection in the alternative route, a final arrival time indicator including a calculated final arrival time to the desired destination based on the alternative route, and a missed connection indicator, including an indication of a predicted impact on the final arrival time due to the user missing the at least one transition connection in the alternative route. In one embodiment, the alternative route notification is provided adjacent the information related to the current route.

According to another embodiment, the method further comprises an act of replacing the information related to the current route with the information related to the alternative route in response to an action by the user. In one embodiment, the method further comprises an act of updating the alternative route notification at periodic intervals. In another embodiment, the information related to the current route further includes a progress indicator including information related to whether the user is currently travelling at an appropriate speed to catch the at least one transit connection in the current route.

According to one embodiment, the method further comprises an act of displaying a warning to the user in response to the progress indicator indicating that the user is currently traveling at an inadequate speed.

One aspect in accord with the present invention provides a routing system for providing a current route to a desired destination of a user, the system comprising a processor, a memory coupled to the processor, a display, a navigation processing component adapted to calculate, based on a current location of the user, current route information related to the current route to the desired destination of the user and alternative route information related to at least one alternative route to the desired destination of the user, and wherein the navigation processing component is adapted to store the current route information and the alternative route information in the memory, and a navigation interface provided on the display, wherein the navigation interface is configured to provide the current route information to the user within the display, and is configured to replace the current route information with the alternative route information from the memory in response to a gesture provided by the user to the navigation interface.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 1:
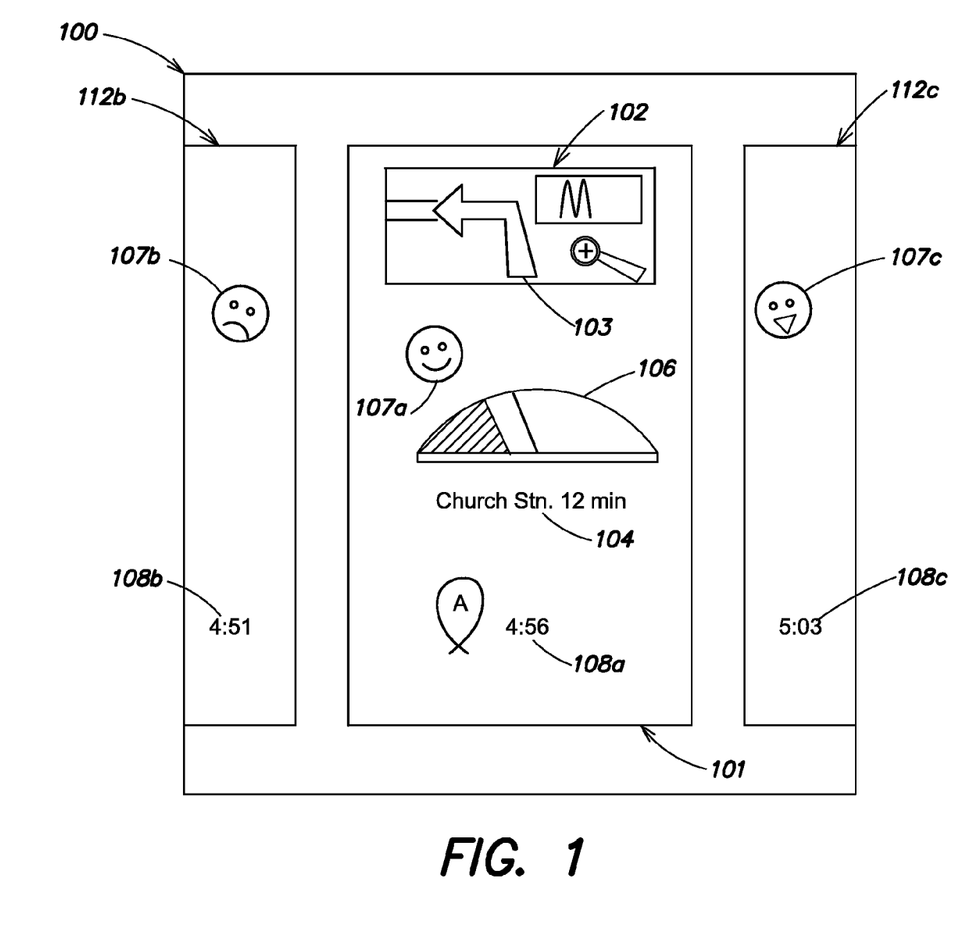
FIG. 1 illustrates a navigation interface in accordance with one embodiment of the present invention.

FIG. 1 illustrates a navigation interface 100 in accordance with one embodiment of the present invention. Upon an individual entering a desired destination into a navigation system (e.g., a navigation system enabled mobile device), the navigation system, using retrieved GPS information related to the current location of the individual, stored map information and transit-related information, generates a multi-step route to the desired destination and provides current route information 101 to the individual via the navigation interface 100 and a display of the navigation system.

The current route information may include one or more indicators, including a route indicator 102, a next connection time indicator 104, a progress indicator 106, an arrival time indicator 108a and a missed connection indicator 107a.

The route indicator 102 displays a geographical representation of the area within which the individual is currently travelling (e.g. including streets, landmarks, services, etc.). The route indicator 102 also displays the next step of the individual's multi-step route in relation to the displayed geographical area. For example, as illustrated in FIG. 1, if the next step of the multi-step route requires that the individual take a left turn onto a designated street, the route indicator 102 displays an arrow 103 turning to the left, on the designated street. As the individual completes the currently displayed step of the multi-step route, the route indicator 102 is updated to display the next step of the multi-step route along with updated information regarding the surrounding area.

The next connection time indicator 104 displays information related to the next step in the multi-step route that is related to a transit connection. The next connection time indicator 104 includes the time until departure of the transit connection (e.g., 12 min. as shown in FIG. 1). According to one embodiment, the connection time indicator 102 also includes text identifying the departure point of the transit connection (e.g., Church Station as shown in FIG. 1).

The progress indicator 106 displays information related to whether the individual is on track to arrive at the departure point in time to catch the transit connection identified in the next connection time indicator 104. The progress indicator 106 informs the individual whether he/she is travelling at an appropriate speed to arrive at the departure point in time, or whether he/she should increase his/her speed to arrive at the departure point in time.

In one embodiment, the missed connection indicator 107a indicates the predicted impact on the final arrival time due to the individual missing the transit connection identified in the next connection time indicator 104. The missed connection indicator 107a is based on current GPS location information related to the individual, stored maps and transit information regarding transit options along the current route (e.g. schedules and/or timetables). According to one embodiment, the missed connection indicator 107a includes an avatar that changes depending on the severity of the impact on the final arrival due to the individual missing the currently identified transit connection. For example, in one embodiment, in response to there being relatively no impact on the final arrival time due to a missed connection, the missed connection indicator 107a includes a smiling face, in response to there being a 1-5 minute delay due to a missed connection, the missed connection indicator 107a includes a face with a worried expression, and in response to there being over a 5 minute delay, the missed connection indicator 107a includes a frowning face. In other embodiments, any other type of avatar may be utilized to display to the user the severity of the predicted delay due to the missed connection.

According to another embodiment, in response to there being some sort of anticipated delay in response to a missed connection, the missed connection indicator 107a may display a new predicted arrival time (i.e., including the anticipated delay). In one embodiment, the new predicted arrival time is based on an alternative route calculated by the navigation system assuming that the individual is going to miss the transit connection.

In another embodiment, the missed connection indicator 107a may be configured to change color based on the severity of the anticipated delay in response to a missed connection. For example, in one embodiment, if relatively no delay is predicted the missed connection indicator 107a is green, if a 1-5 minute delay is predicted the missed connection indicator 107a is orange, and an over 5 minute delay is predicted the missed connection indicator 107a is red. In other embodiments, the color of the missed connection indicator 107a may be defined in any way to represent to an individual the severity of the delay due to the missed connection.

According to other embodiments, the missed connection indicator 107a may also include other forms of notifications related to the anticipated delay due to a missed connection. For example, in one embodiment, due to a delay predicted to be over 5 minutes, the missed connection indicator 107a may begin blinking in order to provide an enhanced warning to an individual. In another embodiment, due to a delay predicted to be over 5 minutes, a mobile device providing the navigation interface 100 vibrates to provide an enhanced warning to an individual that the result of a missed transit connection may be drastic. In other embodiments, any other form of notification (e.g., sound, lights, pop-up messages, etc.) may be provided to an individual to warn the individual about upcoming delays due to a missed transit connection.

By receiving the missed connection indicator 107a, the individual is able to determine how important it is for the individual to catch the current transit connection in the multi-step route. For example, the individual is able to determine whether a missed transit connection will have an impact on his/her final arrival time and how big of an impact it will be. In addition, the progress indicator 106 allows the individual to quickly determine how much effort is required to arrive at the destination point in time to catch the transit connection and whether he/she is currently meeting that level of effort. Therefore, the missed connection indicator 107a and the progress indicator 106 allow an individual to make informed decisions regarding different portions of the individual's current multi-step route. The progress indicator 106 and missed connection indicator 107a are shown in greater detail in FIGS. 2A and 2B.

Figure 2A:
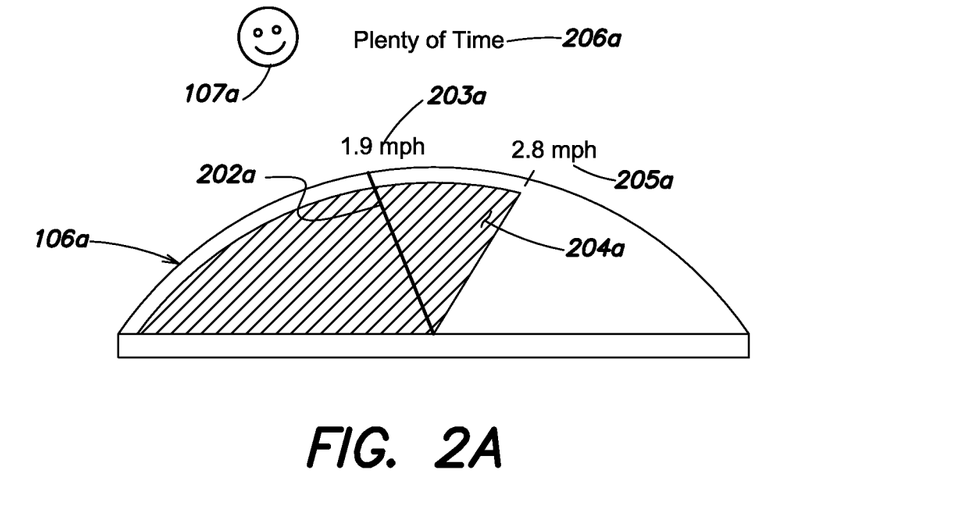
FIG. 2A illustrates a progress indicator indicating that an individual is on time in accordance with one embodiment of the present invention.

FIG. 2A illustrates one embodiment of a progress indicator 106a that is configured to indicate that an individual is on time to make the next transit connection of the current multi-step route. According to one embodiment and as shown by way of example in FIG. 2A, the progress indicator 106a may be in the shape of a speedometer. The progress indicator 106a includes a line 202a and text 203a that indicate the required speed (e.g., 1.9 mph as shown in FIG. 2A) that the individual must be travelling at to arrive at the departure point in time to make the desired transit connection. The progress indicator 106a also may include a shaded area 204a and text 205a that indicate the actual speed of the individual (e.g., 2.8 mph as shown in FIG. 2A). The progress indicator 106a also includes text 206a that informs the individual whether he/she is travelling at an adequate speed to make the transit connection or whether the individual should increase his/her speed.

As shown in FIG. 2A, because the actual speed 204, 205 is greater than the required speed 202, 203, it may be determined that the individual is traveling at an adequate speed to arrive at the departure location in time to catch the transit connection, and so the progress indicator 106a may be adapted to display text 206a that informs the individual that he/she has "Plenty of time" to catch the transit connection. According to one embodiment, the progress indicator 106a turns the color green in response to the individual travelling at an adequate speed to arrive at the destination point in time to catch the transit connection.

FIG. 2A also illustrates one embodiment of the missed connection indicator 107a. As illustrated in FIG. 2A, the missed connection indicator 107 includes a smiling face avatar that represents to the individual that even if the current transit connection was missed, the final arrival time would not be impacted.

Figure 2B:
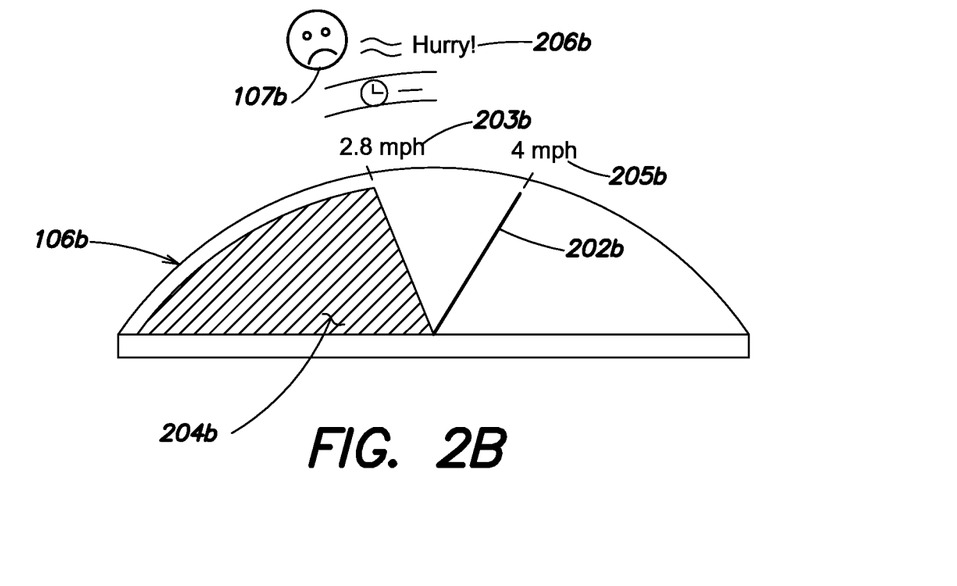
FIG. 2B illustrates a progress indicator indicating that an individual must speed up in accordance with one embodiment of the present invention.

FIG. 2B illustrates one embodiment of a progress indicator 106b that is configured to indicated that an individual is not on time to make the next transit connection of the current multistep route. According to one embodiment and as shown by way of example in FIG. 2B, the progress indicator 106b may be in the shape of a speedometer. The progress indicator 106b includes the line 202b and text 205b that indicate the required speed (e.g., 4 mph as shown in FIG. 2B) that the individual must be travelling at to arrive at the departure point in time to make the desired transit connection. The progress indicator 106b may also include the shaded area 204b and text 203b that indicate the actual speed of the individual (e.g., 2.8 mph as shown in FIG. 2B). The progress indicator 106b also may include text 206b that informs the individual whether he/she are travelling at an adequate speed to make the transit connection or whether the individual should increase his/her speed.

As shown in FIG. 2B, because it may be determined the actual speed 204b, 203b is less than the required speed 202b, 205b, the progress indicator 106b may indicate that the individual is not traveling at an adequate speed to arrive in time to catch the transit connection. The progress indicator 106b may be configured to display text 206b that informs the individual that he/she has to "Hurry" to make the transit connection. According to one embodiment, the progress indicator 106b turns a different color (e.g., the color red) in response to the individual not travelling at an adequate speed to arrive at the destination point in time to catch the transit connection.

FIG. 2B also illustrates one embodiment of the missed connection indicator 107b. As illustrated in FIG. 2B, the missed connection indicator 107b includes a frowning face avatar that represents to the individual that the impact on the final arrival time due to missing the transit connection may be severe (e.g., greater than 5 minutes). Combining this information with the information provided by the progress indicator 106b, the individual is made aware that he/she must increase his/her speed to catch the currently identified transit connection. If the individual does not increase his/her speed, the final arrival time will be impacted.

The arrival time indicator 108a (as shown in FIG. 1) indicates the calculated final arrival time at the desired destination assuming that the individual successfully makes the designated transit connections and that there are no unanticipated delays (e.g., such as a wrong turn, missed connection, reduction in speed, etc). According to one embodiment, the navigation system updates the arrival time indicator 108a periodically (e.g., in one minute intervals) to account for changing speed of the individual, route deviations, or any other variable that could account for the final arrival time needing to be adjusted.

According to one embodiment, the navigation interface 100 also includes alternative routes 112b, 112c. According to one embodiment, the navigation system periodically (e.g. in one minute intervals) calculates potential route alternative to the desired destination based on GPS information related to the individual, stored maps, transit information, and any other useful information (e.g., traveling speed of individual, traffic information, route deviations etc.). This route alternative information may be presented to the individual on the navigation interface 100.

According to one embodiment, and as illustrated in FIG. 1, multiple route alternatives 112b, 112c may be presented to the individual via the navigation interface 100. In one embodiment, the navigation interface 100 displays a notification of a first pre-calculated route alternative 112b on one side of the current route information 101 and a notification of a second pre-calculated route alternative 112c on another side of the current route information 101.

According to one embodiment, the notifications of the first and second route alternatives 112b, 112c may not be as extensive (i.e. do not include as much information) as the current route information 101. For example, in one embodiment, each of the notifications 112b, 112c includes identifiers such as arrival time indicators 108b, 108c and missed connection indicators 107b, 107c. The arrival time indicators 108b, 108c display a calculated alternative arrival time at the desired destination with regards to the associated route alternative 112b, 112c. The missed connection indicators 107b, 107c provide information to the user regarding the predicted impact on the alternative arrival time associated with an alternative route 112b, 112c in the event that the individual misses a transit connection identified in the route alternative 112b, 112c. According to other embodiments, the notifications of route alternatives 112b, 112c may include other identifiers such as a route identifiers 102, next connection time identifiers 104, or progress indicators 106, as discussed above in relation to the current route information 101. Utilizing the current route information and the information provided in the notifications of alternative routes 112b, 112c an individual is able to determine whether he/she would be better off following an alternative route or continuing along the current route.

For example, as illustrated in FIG. 1, a notification of a first route alternative 112b includes an arrival time indicator 108b of 4:51 and a frowning face missed connection indicator 107b informing the individual that if the first alternative route is selected, then a missed transit connection along the first route alternative will result in potentially lengthy delay in reaching the desired destination. A notification of a second route alternative 112c includes an arrival time indicator 108c of 5:03 and a smiling face missed connection indicator 107c informing the individual that if the second alternative route is selected, then a missed transit connection along the second route alternative will result in almost no delay. Comparing the information between the two route alternative notifications 112b, 112c and comparing the information from the route alternative notifications 112b, 112c to the current route information 101, an individual is able to make an informed decision regarding whether he/she should select to follow an alternative route rather than a current route.

For example, if the progress indicator 106 of the current route information 101 informs an individual that he/she needs to exert a greater amount of effort to arrive at the departure point in time to catch the next transit connection and the missed connection indicator 107a of the current route information 101 informs the individual that the final arrival time will be severely impacted as a result of missing the next transit connection in the current route, the individual may determine that he/she does not want to (or cannot) expend the effort required to catch the transit connection. Upon making such a determination, the information provided in the route alternative notifications 112b, 112c adjacent the current route information 101 may assist the individual in quickly selecting an alternative route to follow.

As discussed above and illustrated in FIG. 1, the arrival time indicator 108b of the first alternative route notification 112b indicates an early arrival time of 4:51 associated with the first alternative route but the missed connection indicator 107b of the first alternative route notification 112b indicates the relatively high impact a missed connection will have on the early arrival time. The arrival time indicator 108c of the second alternative route notification 112c indicates a later arrival time of 5:03 associated with the second alternative route and the missed connection indicator 107c of the second alternative route notification 112c indicates the minimal delay a missed connection will cause in the arrival time. If arriving at the desired destination as early as possible is important to the individual, the individual may choose the first route alternative despite the potentially serious delays due to a missed connection. If not risking a large delay is important to the individual, the individual may choose the second route and arrive later but be secure in knowing that a missed connection will result in a minimal (or no) delay.

According to one embodiment, an individual may choose to follow an alternative route, accept one of the alternative routes and replace the current route information 101 with information related to the chosen alternative route 112b, 112c simply by making a slight gesture. For example, in one embodiment, where the interface 100 is displayed on a touch screen display of the navigation system, the individual selects an alternative route by pressing down, using a fingertip, on an area of the display adjacent to the desired alternative route 112b, 112c and moving the finger, while continuously pressing down on the display, toward an area adjacent the current route information 101.

In response to such behavior (otherwise known as swiping), the interface 100 replaces the current route information 101 with information associated with the selected alternative route 112b, 112c. In another embodiment, the individual selects an alternative route by providing a long-press input to the interface 100 on the area of the display adjacent the desired alternative route 112b, 112c. The long-press input may be accomplished by pressing down and holding, using a fingertip, on the area of the display. In one example, the user may hold the area for longer than a typical selection used for other features of the touch screen to distinguish the input. In other embodiments, an individual may interact with and select alternative routes through any other action or appropriate method of interaction with the interface 100.

Figure 3:
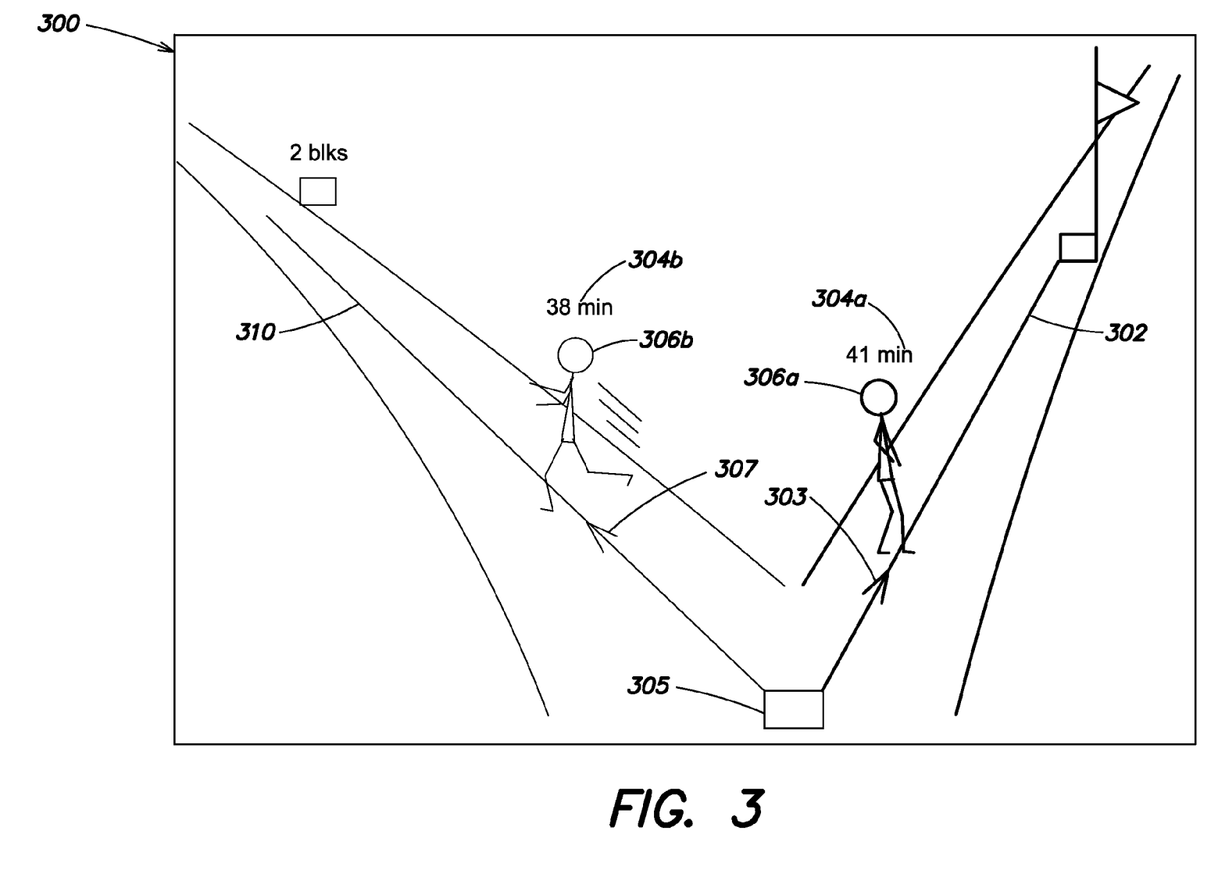
FIG. 3 illustrates another navigation interface in accordance with one embodiment of the present invention.

In other embodiments, a navigation interface may be displayed to the individual in a different way. For example, FIG. 3 illustrates another navigation interface 300 in accordance with one embodiment of the present invention.

The navigation interface 300 includes indicators such as a route indicator 302, a potential route alternative notification 310, next connection time indicators 304a, 304b, and progress indicators 306a, 306b, as discussed above. However, rather then displaying the indicators separately, as shown in FIG. 1, the interface 300 overlays the progress indicators 306a, 306b and the next connection time indicators 304a, 306b over the route indicator 302 and the route alternative notification 310.

The route indicator 302 displays a geographical representation of the area within which the individual is currently travelling (e.g. including streets, landmarks, services, etc.). The route indicator 302 also displays the next step of the individual's multi-step route in relation to the displayed geographical area. For example, as illustrated in FIG. 3, if the next step of the multi-step route requires that the individual bear right at the next fork in the road, the route indicator 302 displays an arrow 303 bearing to the right. As the individual completes the currently displayed step of the multi-step route, the route indicator 302 is updated to display the next step of the multi-step route along with updated information regarding the surrounding area.

The next connection time indicator 304a displays information related to the next step in the multi-step route that is related to a transit connection. The next connection time indicator 304a includes the time until departure of the transit connection (e.g., 41 min as shown in FIG. 3).

The progress indicator 306a displays information related to whether the individual is on track to arrive at the departure point in time to make the transit connection identified in the next connection time indicator 304a. The progress indicator 306a informs the individual whether he/she are travelling at an appropriate speed to arrive at the departure point in time, or whether he/she should increase his/her speed to arrive at the departure point in time. As shown in FIG. 3, the progress indicator 306a includes a walking avatar, indicating to the individual that he/she can continue to walk and that he/she will still arrive at the departure point in less than 41 minutes (i.e. in less time than the next connection time indicator 304a). According to other embodiments, the interface 300 may also include such additional information as an arrival time indicator and a missed connection indicator, as discussed above.

As the individual follows the current route indicator 302 and approaches an intersection 305, the interface 300 displays a potential route alternative notification 310. According to one embodiment, and as shown in FIG. 3, the route alternative notification 310 is shown in relation to the displayed geographical area of the interface 300. For example, if the route alternative 310 requires the individual to bear to the left at the intersection 305 (rather than to the right as indicated in the route indicator 302), the route alternative notification 310 displays an arrow 307 bearing to the left. According to one embodiment, the route alternative notification 310 is displayed in a different color than the route indicator 302.

The route alternative notification 310 also displays a next connection time indicator 304b which provides information related to the next step in the alternative route that is related to a transit connection. The next connection time indicator 304b includes the time until departure of the transit connection (e.g., 38 min as shown in FIG. 3).

The progress indicator 306b of the route alternative notification 310 displays information related to whether the individual is on track to arrive at the departure point in time to make the transit connection identified in the next connection time indicator 304b of the alternative route. The progress indicator 306b informs the individual whether he/she travelling at an appropriate speed to arrive at the departure point in time, or whether he/she should increase his/her to arrive at the departure point in time. As shown in FIG. 3, the progress indicator 306b of the alternative route notification 310 includes a running avatar, indicating to the individual that he/she must increase his/her speed if he/she wishes to arrive at the departure point in less than 38 minutes (i.e. in less time that the next connection time indicator 304b). According to other embodiments, the alternative route notification 310 may also include such additional information as an arrival time indicator and a missed connection indicator, as discussed above.

Upon arriving at the intersection 305, the individual may use the information provided on the route indicator 302 and the route alternative notification 310 to make a determination whether he/she should continue on with the current route (i.e. bear to the right), or switch to an alternate route (i.e. bear to the left). For example, if the individual determines that it is important to reach the desired destination as soon as possible, the individual may choose the alternative route with an earlier departure time, understanding that he/she will need to increase his/her speed to catch the next transit connection. If the individual prefers to continue along at the current pace, the individual may choose the current route.

Utilizing the pre-calculated information provided on the interface 300, an individual is able to make quick route decisions while being informed of the impact his/her decisions will have.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 4:
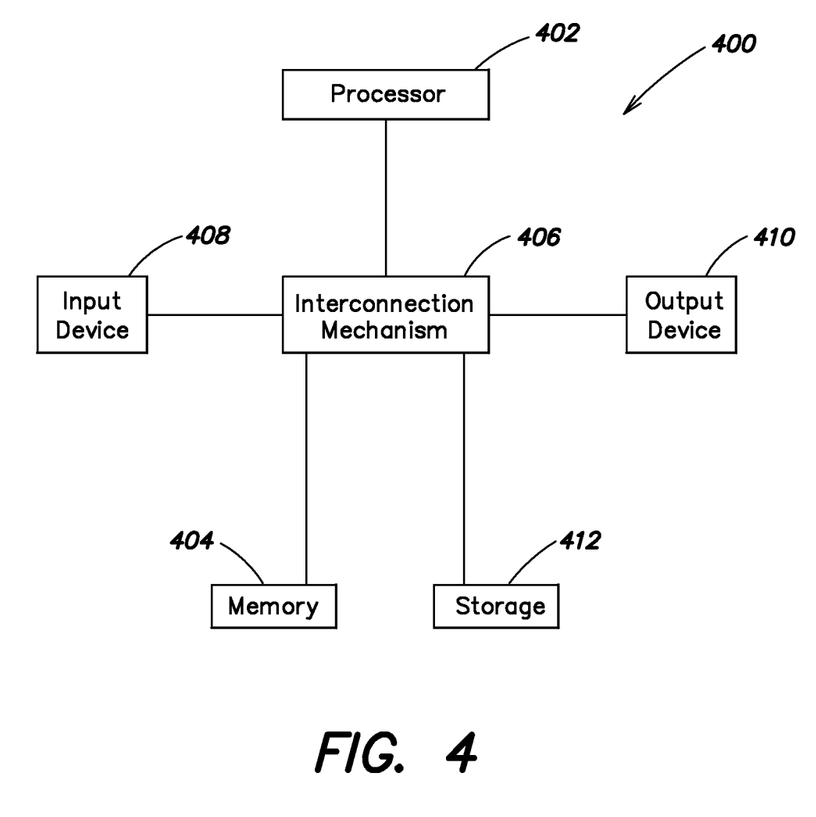
FIG. 4 is a block diagram of a general-purpose computer system upon which various embodiments of the invention may be implemented.

For example, various aspects of the invention may be implemented as specialized software executing in a general-purpose computer system 400 such as that shown in FIG. 4. The computer system 400 may include a processor 402 connected to one or more memory devices 404, such as a disk drive, memory, or other device for storing data. Memory 404 is typically used for storing programs and data during operation of the computer system 400. Components of computer system 400 may be coupled by an interconnection mechanism 406, which may include one or more busses (e.g., between components that are integrated within a same machine) and/or a network (e.g., between components that reside on separate discrete machines). The interconnection mechanism 406 enables communications (e.g., data, instructions) to be exchanged between system components of system 400. Computer system 400 also includes one or more input devices 408, for example, a keyboard, mouse, trackball, microphone, touch screen, and one or more output devices 410, for example, a printing device, display screen, and/or speaker. In addition, computer system 400 may contain one or more interfaces (not shown) that connect computer system 400 to a communication network (in addition or as an alternative to the interconnection mechanism 406).

Figure 5:
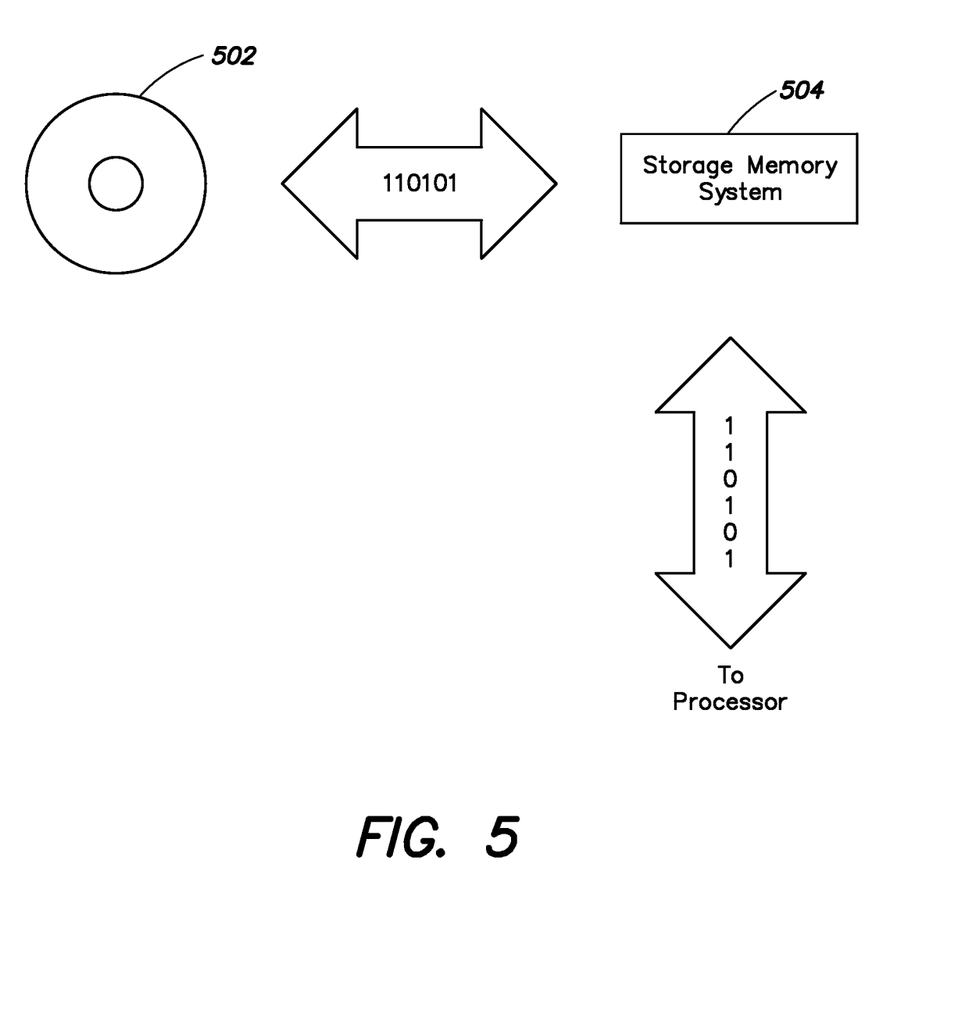
FIG. 5 is a block diagram of a computer data storage system with which various embodiments of the invention may be practiced.

The storage system 412, shown in greater detail in FIG. 5, typically includes a computer readable and writeable nonvolatile recording medium 502 in which signals are stored that define a program to be executed by the processor or information stored on or in the medium 502 to be processed by the program. The medium may, for example, be a disk or flash memory. Typically, in operation, the processor causes data to be read from the nonvolatile recording medium 502 into another memory 504 that allows for faster access to the information by the processor than does the medium 502. This memory 504 is typically a volatile, random access memory such as a dynamic random access memory (DRAM) or static memory (SRAM). It may be located in storage system 412, as shown, or in memory system 404. The processor 402 generally manipulates the data within the integrated circuit memory 404, 504 and then copies the data to the medium 502 after processing is completed. A variety of mechanisms are known for managing data movement between the medium 502 and the integrated circuit memory element 404, 504, and the invention is not limited thereto. The invention is not limited to a particular memory system 404 or storage system 412.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 402 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described herein, the navigation interfaces are implemented in navigation system enabled mobile devices; however, in other embodiments, the interfaces may be implemented in any type of navigation system such as a desktop or mobile routing tool.

As described herein, the navigation interface is displayed in different configurations as described with regards to FIG. 1 and FIG. 3; however, in other embodiments, the navigation interface may be configured in any appropriate way and may include any number or type of the identifiers discussed above.

As also described herein, the progress indicator includes a speedometer or avatar; however, in other embodiments, the progress indicator may be configured in any appropriate way. For example, in one embodiment where the progress indicator is displayed on top of a route indicator, the progress indicator includes a first avatar travelling along the route at an "ideal" pace and a second avatar traveling at a pace representative of the actual progress made by an individual. If the individual's avatar is behind the "ideal" avatar, then the individual needs to increase his/her speed. Conversely, if the individual's avatar is in front of the "ideal" avatar, then the individual can slow down or even take a break.

As also described herein, the missed connection indicator includes an avatar including a facial expression; however, in other embodiments, the missed connection indicator may be configured in any appropriate way.

As described herein, the navigation interface provides notifications to a user regarding the impact a missed transit connection will have on the user's final arrival time. However, in other embodiments, the navigation interface may be used in any situation where it is desired for a user to reach a certain point or destination at a certain time. For example, in one embodiment, where a user is utilizing the navigation interface to generate a non transit-based route, the navigation interface may provide notifications to the user regarding the impact a missed turn (e.g. onto a certain street or at a certain exit) will have on the user's final arrival time (e.g. due to traffic, longer travel time, or longer distance on a calculated route alternative).

As such, at least some embodiments herein provide a navigation interface which provides notifications to a user regarding the impact a missed transit connection will have on the user's final arrival time. The navigation interface may also provide pre-calculated transit-based route alternatives. The missed connection notifications and pre-calculated alternatives may allow an individual to make more informed decisions regarding the route he/she is travelling to his/her desired destination.

At least some embodiments herein provide a navigation interface which provides notifications to a user regarding the impact a missed transit connection will have on the user's final arrival time. The navigation interface may also provide pre-calculated transit-based route alternatives. The missed connection notifications and pre-calculated alternatives may allow an individual to a make more informed decisions regarding the route he/she is travelling to his/her desired destination.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A routing system for providing a current route to a desired destination of a user, the current route including at least one transit connection, the system comprising:
   a display; and
   a navigation interface provided on the display, the interface configured to provide current route information related to the current route to the user, the current route information including:
      a route indicator displaying at least one step of the current route;
      a next connection time indicator displaying a departure time of the at least one transit connection in the current route;
      an arrival time indicator displaying a calculated final arrival time at the destination based on the current route; and
      a missed connection indicator displaying a notification representative of a predicted impact on the calculated final arrival time due to the user missing the at least one transit connection.

2. The routing system of claim 1, wherein the interface is further configured to provide at least one pre-calculated alternative route notification to the user.

3. The routing system of claim 2, wherein the at least one pre-calculated alternative route notification provides alternative route information related to an alternative route to the desired destination, the alternative route information including at least one of:
   an alternative route indicator displaying at least one step of the alternative route;
   an alternative next connection time indicator displaying a departure time of at least one transit connection in the alternative route;
   an alternative arrival time indicator displaying a calculated alternative final arrival time at the destination based on the alternative route; and
   an alternative missed connection indicator displaying a notification representative of a predicted impact on the alternative final arrival time due to the user missing the at least one transit connection in the alternative route.

4. The routing system of claim 3, wherein the at least one pre-calculated alternative route notification is provided adjacent the current route information.

5. The routing system of claim 4, wherein the navigation interface 5 is further configured to replace the current route information with the alternative route information in response to an action by the user.

6. The routing system of claim 5, wherein the display is a touch screen and the action by the user is at least one of a swiping action and a long-press input on the display.

7. The routing system of claim 3, wherein the at least one pre-calculated alternative route notification is overlaid on top of the current route indicator.

8. The routing system of claim 1, wherein the missed connection indicator includes an avatar.

9. The routing system of claim 8, wherein the avatar includes a facial expression.

10. The routing system of claim 1, wherein the interface is further configured to provide a progress indicator, the progress indicator providing information related to whether the user is currently travelling at an appropriate speed to catch the at least one transit connection in the current route.

11. The routing system of claim 10, wherein the progress indicator is represented by a speedometer.

12. A method for providing a current route to a desired destination of a user via a routing system, the routing system including a navigation interface and memory, the method comprising acts of:
   receiving, with the navigation interface, the desired destination of the user, current GPS information of the user, and transit information:
   generating, based on the desired destination of the user, the current UPS information of the user, the transit information, and map information stored in memory, a current route to the desired destination, the current route including at least one transit connection;
   providing, with a display of the navigation interface, information related to the current route including:
      a route indicator including at least one step of the current route;
      a next connection time indicator displaying a departure time of the at least one transit connection in the current route;
      a final arrival time indicator including a calculated final arrival time at the desired destination based on the current route;
      a missed connection indicator including an indication of a predicted impact on the final arrival time due to the user missing the at least one transition connection in the current route.

13. The method of claim 12, further comprising acts of:
   generating, based on the desired destination of the user, the current UPS information of the user, the transit information, and map information stored in memory, at least one alternative route to the desired destination, the at least one alternative route including at least one transit connection; and
   providing an alternative route notification to the user, the alternative route notification including information related to the alternative route including at least one of:
      a route indicator including at least one step of the alternative route;
      a next connection time indicator including a departure time of the at least one transit connection in the alternative route;
      a final arrival time indicator including a calculated final arrival time to the desired destination based on the alternative route; and
      a missed connection indicator, including an indication of a predicted impact on the final arrival time due to the user missing the at least one transition connection in the alternative route.

14. The method of claim 13, wherein the alternative route notification is provided adjacent the information related to the current route.

15. The method of claim 13, further comprising an act of replacing the information related to the current route with the information related to the alternative route in response to an action by the user.

16. The method of claim 13, further comprising an act of updating the alternative route notification at periodic intervals.

17. The method of claim 12, wherein the information related to the current route further includes a progress indicator including information related to whether the user is currently travelling at an appropriate speed to catch the at least one transit connection in the current route.

18. The method of claim 17, further comprising an act of displaying a warning to the user in response to the progress indicator indicating that the user is currently traveling at an inadequate speed.

* * * * *